(12) United States Patent
Volanen et al.

(10) Patent No.: US 12,735,282 B2
(45) Date of Patent: Sep. 15, 2026

(54) LOADING SYSTEM FOR LOADING TRANSPORT UNIT

(71) Applicant: Metsi Group Oy, Oitti (FI)

(72) Inventors: Ville Volanen, Oitti (FI); Simo Aitto-Oja, Oitti (FI)

(73) Assignee: Metsi Group Oy, Oitti (FI)

( * ) Notice: Subject to any disclaimer, the term of this patent is extended or adjusted under 35 U.S.C. 154(b) by 257 days.

(21) Appl. No.: 18/501,611

(22) Filed: Nov. 3, 2023

(65) Prior Publication Data

US 2025/0145398 A1 May 8, 2025

(51) Int. Cl.
*B65G 67/20* (2006.01)

(52) U.S. Cl.
CPC .................................... *B65G 67/20* (2013.01)

(58) Field of Classification Search
CPC ......... B65G 67/20; B65G 67/02; B65G 67/04
See application file for complete search history.

(56) References Cited

U.S. PATENT DOCUMENTS 7,588,406 B2 * 9/2009 Frankel ................ B65G 69/006 414/403
9,359,154 B2 * 6/2016 Grady .................... B65G 67/20
10,059,538 B1 * 8/2018 Haub ......................... B65F 9/00
10,737,891 B1 * 8/2020 Haub ...................... B65G 67/20
11,383,942 B1 * 7/2022 Haub ..................... B30B 9/3021
2011/0058922 A1 * 3/2011 Auriemma ............. B65G 67/20 414/400
2012/0189414 A1 * 7/2012 Lukesic ................. B65G 67/20 414/349

FOREIGN PATENT DOCUMENTS

CN 216889162 U * 7/2022 ............. B65G 67/20
SU 1105429 A1 * 7/1984 ............. B65G 67/20
WO WO-9946195 A1 * 9/1999 ............. B65G 67/20
WO WO-2011039415 A1 * 4/2011 ............. B65G 67/20

* cited by examiner

*Primary Examiner* — Kaitlin S Joerger
(74) *Attorney, Agent, or Firm* — Meunier Carlin & Curfman LLC

(57) ABSTRACT

The application relates to a loading system for loading a transport unit. The loading system comprises a chassis, a loading carriage mounted on the chassis, and a supporting device mounted on the chassis. The loading system is configured to drive the loading carriage with respect to the chassis in a loading direction. The loading system is further configured to arrange the supporting device against a load on the loading carriage to support the load when the loading carriage is driven out from under the load. The supporting device comprises an upper supporting part configured project in the loading direction from other parts of the supporting device so that the loading system is further configured to project the upper loading part with respect to the other parts of the supporting device to incline the load in the loading direction for preventing a loading damage of the load.

16 Claims, 2 Drawing Sheets

LOADING SYSTEM FOR LOADING TRANSPORT UNIT

TECHNICAL FIELD

The application relates generally to a loading system for loading a transport unit.

BACKGROUND

A known one-shot loading system for loading palletized or non-palletized goods to a cargo space of a transport container comprises a chassis and a conveyor mounted on the chassis so that the conveyor can move along the chassis to the transport container and back. The known loading system further comprises a buffer structure, which comprises a buffer beam and a massive lifting gate structure to lift and to lower the buffer beam vertically, at a loading end of the chassis.

The goods are loaded successively on the conveyor, which is then driven through the lifting gate structure, when the buffer beam has been lifted up, to the transport container. When the goods are inside the transport container, the buffer beam is lowered in the lifting gate structure to contact and to support an end of successively loaded goods. The conveyor is driven out from under the goods while the end of the goods is supported by the lowered buffer beam as long as the conveyor is under the goods.

When the conveyor has been driven out from the transport container and the goods are in the transport unit, the buffer beam is lifted by the lifting gate structure and the loading system is again ready for a next loading operation.

SUMMARY

One object of the invention is to withdraw the drawbacks of known solutions and to provide a loading system, which comprises two-part and two-step (phase) supporting device, prevents loading damages of a load, especially loading damages in a lower rear part and rear surface of a last load item, in a one (single)-shot loading operation, lightens a structure of a supporting device, and improves a stability of the loading system.

One object of the invention is fulfilled by providing the loading system, loading method, and computer-readable medium according to the independent claims.

Some embodiments of the invention are the loading system, loading method, and computer-readable medium according to the independent claims.

One loading system for loading a transport unit comprises a chassis, a loading carriage mounted on the chassis, and a supporting device mounted on the chassis. The loading system is configured to drive the loading carriage with respect to the chassis in a loading direction. The loading system is further configured to arrange the supporting device against a load on the loading carriage to support the load when the loading carriage is driven out from under the load. The supporting device comprises an upper supporting part (upper buffer beam) configured project in the loading direction from other parts of the supporting device so that the loading system is further configured to project the upper loading part with respect to the other parts of the supporting device to incline the load in the loading direction for preventing a loading damage of the load.

One loading method for loading a transport unit comprises a following step of driving, by a controller, a loading carriage on a chassis with respect to the chassis on the loading carriage in a loading direction. The loading method further comprises a following step of arranging, by the controller, a supporting device mounted on the chassis against a load on the loading carriage to support the load when the loading carriage is driven out from under the load. The loading method further comprises a following step of projecting, by the controller, an upper loading part of the supporting device in the loading direction with respect to other parts of the supporting device to incline the load in the loading direction for preventing a loading damage of the load.

One tangible, non-transitory (non-volatile) computer readable medium comprises a computer program that comprises instructions, which, when the computer program is executed by a controller (computer), cause the controller to carry out at least the steps of the previous loading method in the previous loading system.

BRIEF DESCRIPTION OF THE FIGURES

The exemplary embodiments are explained with reference to the following figures.

DETAILED DESCRIPTION OF THE FIGURES

Figures 1, 2A, 2B:
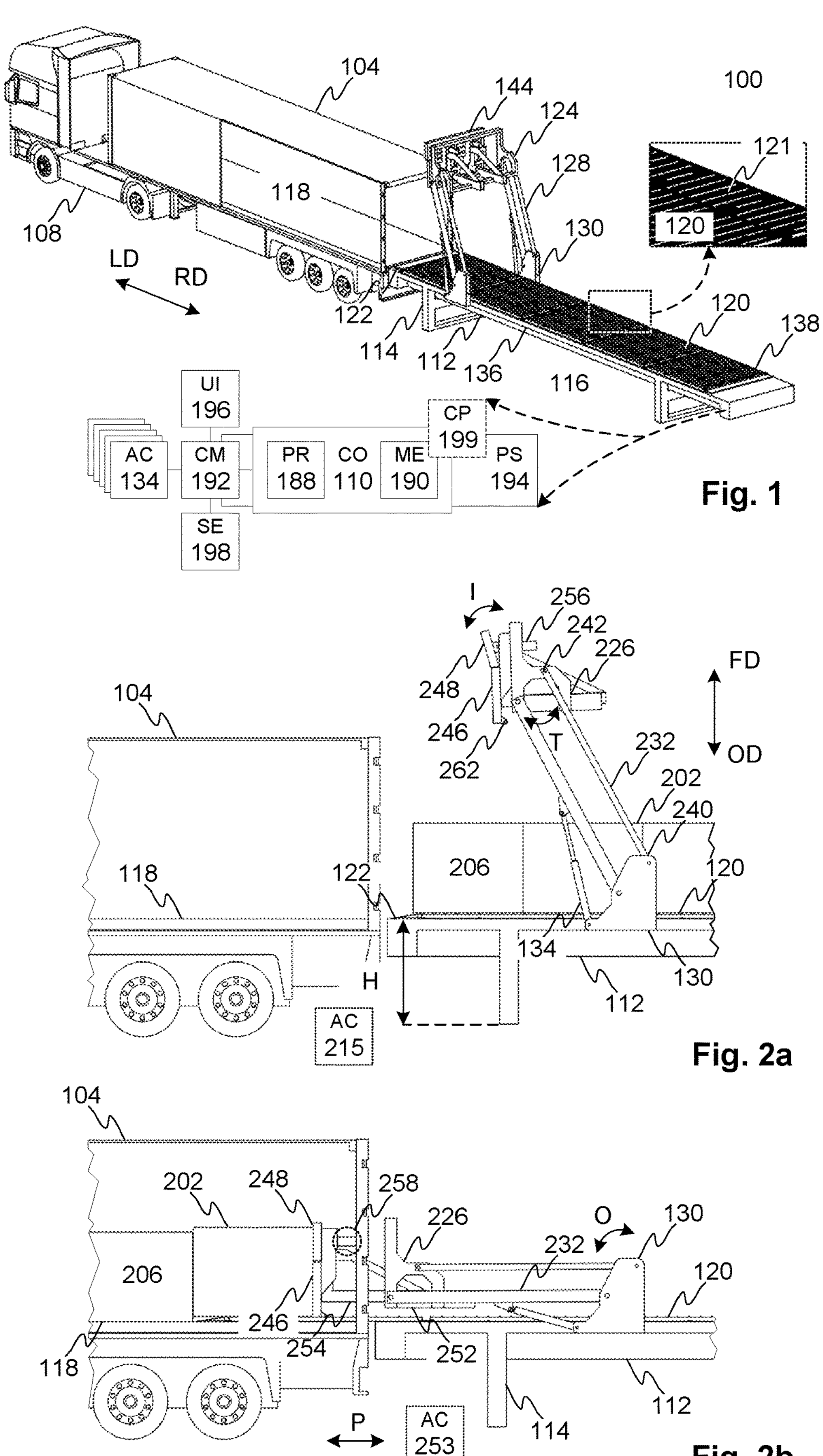
FIG. 1 presents a loading system
FIG. 2*a*-2*c* present an operation of the loading system from a side view

FIGS. 1 and 2*a*-2*c* presents a loading system 100 for loading a load 202 into a transport unit 104 in a one (single)-shot loading operation.

The load 202 comprises at least one transportable item 206, e.g., one, two, three, four, or more items. An item 206 comprises e.g., a paper reel, goods on a pallet, or goods in a transportation box, e.g., a carboard box or a crate.

The transport unit 104 comprises an unmodified cargo space, e.g., an open cargo space of a truck 108 or a trailer, closed cargo space (container) 104 of the truck 108 according to the figure, closed cargo space of the trailer, or a freight container.

The loading system 100 comprises a controller 110 that is configured to control operating parts 114, 120, 124, 134, 192, 194, 196, 198 of the loading system 100 to operate the loading system 100.

The loading system 100 further comprises a chassis 112 that is configured to establish a support structure, a mounting structure, and a protective structure for parts 110, 120, 134, 192, 194, 196, 198 of the loading system 100.

The chassis 112 comprises legs 114 that are configured to mount the loading system 100 on a mounting platform (surface) 116 and to adapt a height H of the chassis 112 to match (level) the chassis 112 and a bottom surface 118 of the transportation unit 104. Each leg 114 comprises an adjusting actuator 215 that is configured to adjust the height H of the chassis 112 with respect to the mounting platform 116 and the bottom surface 118 in a vertical direction FD, OD.

The loading system 100 further comprises a loading carriage (conveyor) 120 mounted on the chassis 112 so that it rests on an upper part of the chassis 112 and can move along the chassis 112. The loading carriage 120 is configured to move, to carry the load 202, and to drive the load 202 at least in a loading direction LD. The loading carriage 120 is further configured to move in a retracting direction RD, which is opposite the loading direction LD, after it has left the load 202 in the transportation unit 104.

The loading carriage 120 comprises rollers 121 that are configured to move the loading carriage 120 on the chassis 112 along its structure in the loading direction LD and the retracting direction RD. The loading carriage 120 further comprises a ramp 122 mounted at a ramp end of the loading carriage 120, which is in the loading direction LD. The ramp 122 is configured to incline the load 202, at least a last item 206, according to a movement N when the loading system 100 drives the loading carriage 120 out from under the load 202 (last item 206) in the retracting direction RD.

The loading system 100 further comprises a supporting (buffer) device 124 mounted on the chassis 112 so that the supporting device 124 rests on the upper part of the chassis 112 and it is connected to the chassis 112 closer to the ramp end, which is in the loading direction LD, than a rear end of the chassis 112 in the retracting direction RD. The loading support 124 is configured to allow the loading carriage 120 to move through it, to support the load 202, and to restrain the load 202, when the loading system 100 drives the loading carriage 120 out from under the load 202 in the retracting direction RD.

The supporting device 124 comprises a frame 226 that is configured to establish a support structure, a mounting structure, and a protective structure for actuators and associated parts of the supporting device 124. The supporting device 124 further comprises a lifting mechanism 128 that is configured to lift the frame 226 vertically with respect to the chassis 112 in the lifting direction FD to prevent a loading damage of the load 202 because of a collision of the loading carriage 120, the load 202, or both to structures of the supporting device 124 so that the lifting mechanism 128 allows the loading carriage 120 and the load 202 on the loading carriage 120 to move through the structures of the supporting device 124. The lifting mechanism 128 is further configured to lower the frame 226 (supporting device 124) vertically with respect to the chassis 112, in the lowering direction OD, which is opposite the lifting direction FD, when the load 202 requires a support and it has been driven through the lifted supporting device 124.

The supporting device 124 (lifting mechanism 128) further comprises a mounting part 130 connected to the chassis 112, at least one shaft (beam) 232, e.g., one. two according to the figures, three, four, or more shafts, connected between the frame 226 and the mounting part 130, and a lifting actuator 234 on each (right and left) side 136, 138 of the chassis 112 in the loading direction LD so that a mounting end 240 of the shaft(s) 232 is configured to rotate on the mounting part 130 according to movements O and the frame 226, which is connected to a supporting end 242 of the shaft(s) 232, is configured to rotate on the supporting end 242 according to movements T.

The supporting device 124 further comprises a supporting (buffer) part 144, which comprises two elongated supporting parts (buffer beams) 246, 248, connected to (mounted on) the frame 226 substantially perpendicular to the loading and retracting directions LD, RD. The supporting parts 246, 248 comprises a lower supporting part (buffer beam) 246 and an upper supporting part (buffer beam) 248, which is mounted above the lower supporting part 246 in the vertical direction. The supporting part 144 is configured to mount against a rear surface 250 of the last item 206 of the load 202 and to support the load 202, when the loading system 100 drives the loading carriage 120 out from under the load 202 in the retracting direction RD.

The supporting part 144 further comprises a pushing mechanism 252 that is configured to move the lower and upper supporting parts 246, 248 together with respect to the chassis 112 and the frame 226 in the loading direction LD according to a movement P to support the load 202. The pushing mechanism 252 is further configured to move the lower and upper supporting parts 246, 248 together with respect to the chassis 112 and the frame 226 in the retracting direction RD according to an opposite movement P. The pushing mechanism 252 comprises a pushing actuator 253 connected to the frame 226 so that the pushing actuator 253 is configured to actuate the substantially horizontal movement P of the lower and upper supporting parts 246, 248 in the loading and retracting directions LD, RD. The pushing mechanism 252 further comprises a pushing member 254 between the frame 226 and the pushing actuator 253. The pushing member 254 is configured to move the lower and upper supporting parts 246, 248 simultaneous in consequence of the actuation of the pushing actuator 253.

The supporting part 144 further comprises a projecting mechanism 256 that is configured to project (move) the upper supporting part 248 independently of other parts 128, 130, 226, 232, 234, 246, 252 of the supporting device 124 in the loading direction LD according to a movement R to support the load 202 and to incline the load 202 in the loading direction LD according to the movement N for preventing a loading damage of the load 202. The projecting mechanism 256 is further configured to move (retract) the upper supporting part 248 independently with respect to the chassis 112, the frame 226, and the lower supporting part 246 in the retracting direction RD according to an opposite movement R.

The projecting mechanism 256 comprises a projecting actuator 257 between the upper supporting part 248 and the pushing mechanism 252 so that the projecting actuator 257 is configured to actuate the substantially horizontal movement R of the upper supporting part 248 in the loading direction LD after the pushing movement P in the loading direction LD and in the retracting direction RD before or after the retracting movement P in the retracting direction RD when the load 202 does not require support anymore.

The projecting mechanism 256 further comprises a projecting member 258 between the upper supporting part 248 and the projecting actuator 257. The projecting member 258 is configured to move the upper supporting part 248 in consequence of the actuation of the projecting actuator 257 according to the movement R. The projecting mechanism 256 further comprises a hinge 260 between the upper supporting part 248 and the projecting actuator 257 (projecting member 258). The hinge 260 is configured incline the upper supporting part 248 with respect to the projecting member 258 and the projecting actuator 257 in the loading direction LD according to a movement I so that the upper supporting part 248 mounts against the rear surface 250 of the inclined load 202.

The ramp 122 is configured to incline the load 202 together with the upper supporting part 202 according to the movement N, when the loading system 100 drives the loading carriage 120 out from under the load 202 in the retracting direction RD and the upper supporting part 248 projects from the other parts 128, 130, 226, 232, 234, 246, 252 of the supporting device 124 in the loading direction LD synchronously.

The supporting device 124 further comprises wheels 262 mounted on the lower supporting part 246. The wheels 262 are configured to support the lower supporting part 246 at least against the loading carriage 120, the ramp 122, and finally the bottom surface 118 of the transportation unit 104, when the loading carriage 120 moves with respect to the chassis 112 in the retracting direction RD.

Each actuator, which comprise the adjusting actuators 215, lifting actuators 134, pushing actuators 253, and projecting actuators 257, comprises a hydraulic cylinder, electric belt-driven actuator, rack and pinion-driven actuator, gearwheel-driven actuator, electric cylinder, or pneumatic cylinder.

The loading system 100 may alternatively comprise a lifting gate mechanism instead of the lifting mechanism 128 (not presented), whereupon the supporting device 124, which is mounted on the lifting gate mechanism, is configured to move vertically in the lifting and lowering directions FD, OD between the structures of the lifting gate mechanism and to support the load 202 by the supporting part 144, which comprises the lower and upper supporting parts 246, 248, as previously has been explained.

Figure 3:
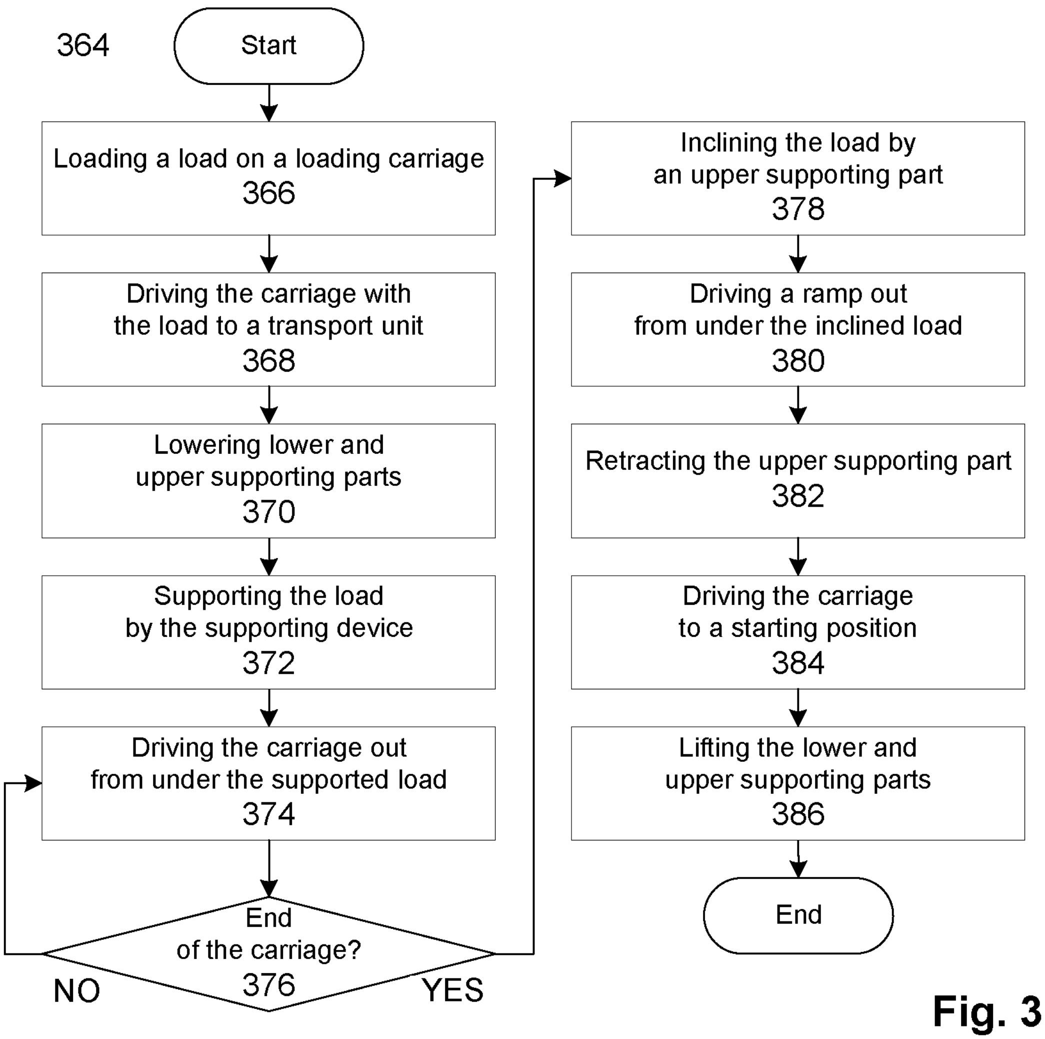
FIG. 3 presents a flowchart of a loading method

FIG. 3 presents a loading system 364 for loading the transportation unit 104. The loading method 364 is carried out by the loading system 100, which has been previously and later on explained.

At a step 366, the transportation unit 104 is driven close to the chassis 112 so that it is possible to load the load 202 into the transportation unit 104. The loading carriage 120 is driven, by the controller 110, in the retracting direction RD to a starting position, wherein the loading carriage 120 is completely on the chassis 112 according to FIG. 1, if necessary. The supporting device 124 is further lifted, by the controller 110 and the lifting actuators 134, in the lifting direction FD according to the same figure, if necessary. The upper supporting part 248 is retracted, by the controller 110 and the projecting actuator 257, in the retracting direction RD against the pushing mechanism 252 and the pushing mechanism 252 is retracted, by the controller 110 and the pushing actuator 253, in the retracting direction RD against the frame 226, if necessary. The chassis 120 is further matched, by the controller 110, the adjusting actuators 215, and at least one sensor 198, to the bottom surface 118 of the transportation unit 104, if necessary.

Figure 2C:
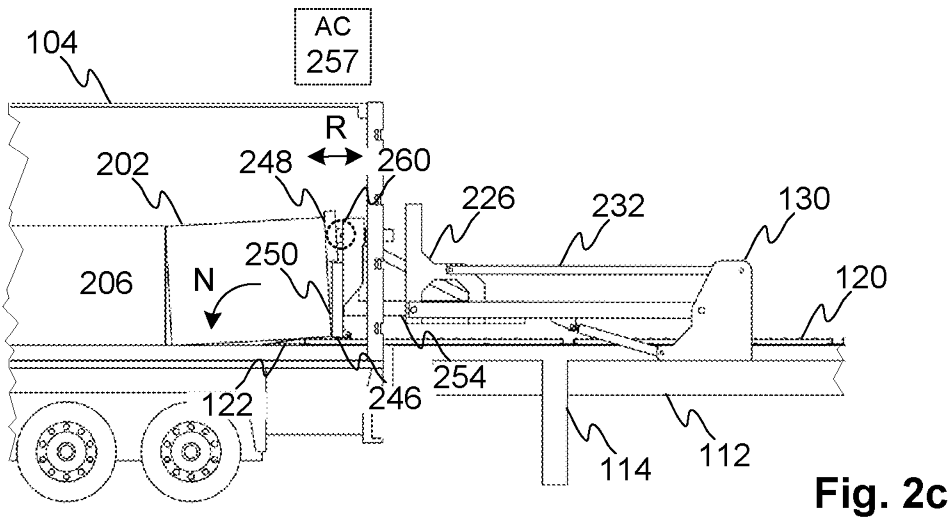

At the step 366, the load 202 is then loaded, e.g., by a lifting truck or by other means, on the loading carriage 120 from a retracting end of the chassis 112 or alternatively or additionally from at least one side of the chassis 112 so that the items 206 are positioned successively according to FIG. 2*a*-2*c*.

At a step 368, the loading carriage 120 with the load 202 is driven, by the controller 110, through the structures of lifted supporting device 120, between the mounting parts and shafts 130, 232 on each side of the chassis 112, in the loading direction LD into an interior of the transportation unit 104 according to FIG. 2*b* so that the rollers 121 of the loading carriage 120 moves the loading carriage 120 and the load 202 from the chassis 112 to the transportation unit 104 and on its bottom surface 118 as far as necessary.

At a step 370, the supporting device 124 is then lowered, by the controller 110 and the lifting actuators 134, in the lowering direction OD according to FIG. 2*b*. The supporting part 144 is against the frame 226.

At a step 372, the supporting part 144 is pushed, by the controller 110 and the pushing actuator 253, according to FIG. 2*b* in the loading direction LD against the rear surface 250 of the last item 206, to support the load 202 on the loading carriage 120 by means of the lower and upper supporting parts 246, 248.

At a step 374, the loading carriage 120 is driven, by the controller 110, in the retracting direction RD out from under the load 202 while the supporting device 120 supports, by the controller 110 and the pushing actuator 253, the load 202 from its rear surface 250 by means of the lower and upper supporting parts 246, 248. The supporting device 124 is supported, by the wheels 262, against an upper surface of the loading carrier 120 and a vertical position of the supporting device 120 follows a shape of the upper surface of the loading carrier 120.

At a step 376, the retraction of the loading carriage 120 and the support of the supporting device 120 continues until the controller 110 detects on the grounds of a previously known length of the loading carriage 120 or sensed information from the at least one sensor 198 of the loading system 100 that the ramp end of the loading carriage 120, i.e. the ramp 122, is coming under the last item 206 or it is already under the last item 206.

At a step 378, when the ramp 122 is coming under the last item 206 or it is already under the last item 206, the upper supporting part 248 is projected, by the controller 110 and the projecting actuator 257, in the loading direction LD from the frame 226, the pushing mechanism, and the lower supporting part 246 to start (cause) the inclination of the last item 206 in the loading direction LD.

At a step 380, when the last item 206 is supported by means of the supporting device 124, the loading carriage 120 comes out from under the last item 206, whereupon the ramp 122 comes out from under the last item 206 and, at the same time, a front part of the last item 206 follows a surface of the ramp 122 and inclines in the loading direction LD according to the movement N due to a shape of the ramp 122 and the support of the supporting part 124 (upper supporting part 248) to prevent the loading damage of a lower rear part of the last item 206.

At a step 380, at the same time when the last item 206 slides along the ramp 122 on the bottom surface 118 of the transportation unit 104, the supporting part 124 lifts up, by the last item 206, vertically in the lifting direction FD, when the last item 206 inclines according to the movement N in the loading direction LD, and then lowers, by earth gravity, vertically in the lowering direction OD, when the ramp 122 comes out from under the last item 206 completely, to prevent a further loading damage of the rear surface 250 of the last item 206.

At a step 382, the upper supporting part 248 is retracted, by the controller 110 and the projecting actuator 257, in the retracting direction RD against the pushing mechanism 252 and the pushing mechanism 252 is retracted, by the controller 110 and the pushing actuator 253, in the retracting direction RD against the frame 226, if necessary.

At a step 384, the loading carriage 120 is driven, by the controller 110, in the retracting direction RD to the starting position, if the loading carriage 120 is not already in the starting position.

At a final step 386, the supporting device 124 is lifted, by the controller 110 and the lifting actuators 134, in the lifting direction FD to prepare the loading system 100 for a next one-shot loading operation of another transportation unit 104.

Back to FIG. 1, which finally presents last parts of the loading system 100. The controller 110 is configured to receive information from the operating parts 114, 120, 124, 134 and to control an operation of the operating parts 114, 120, 124, 134 e.g., one, four, eight, twelve, or more operating parts, on grounds of the received information, e.g., the sensed information from the loading system 100.

The controller 110 comprises a processor 188 to carry out operator-initiated instructions, computer program (application, software)-initiated instructions, or both, and to process data to run computer programs. The processor 188 comprises at least one processor, e.g., one, two, three, four, or more processors.

The controller 110 further comprises a memory 190 to store and to maintain information. The information comprises e.g., instructions, computer programs, and information files. The memory 190 comprises at least one memory, e.g., one, two, three, four, or more memories.

The loading system 100 further comprises a communicator 192 that the controller 110 is configured to control to send commands to at least one of e.g., the operating part(s) 114, 120, 124, 134, 196, 198 in the loading system 100. The controller 110 is further configured to control the communicator 192 to receive information from at least one of e.g., the operating parts 114, 120, 124, 134, 196, 198. The communication between the communicator 192 and at least one of the operating parts 114, 120, 124, 134, 196, 198 in the loading system 100 is carried out through a wired connection(s), wireless connection(s), or both connections.

The loading system 100 further comprises a power supplier 194 that the controller 110 is configured to control to power the operation of the loading system 100. The power supplier 194 comprises at least one supplier part to power the loading system 100, e.g., a connection to an external power source, e.g., to a power network or other power source, at least one battery, e.g., one, two, three, four, or more batteries, regulator, or other supplier part.

The loading system 100 further comprises a user interface 196 that the controller 110 is configured to control to receive instructions, requests, or information e.g., from the operator or other entity. The controller 110 is further configured to control the user interface 196 to present instructions, requests, or information e.g., to the operator or other entity.

The loading system 100 further comprises the at least one sensor 198, e.g., one, two, three, four, or more sensors, that is configured to sense necessary information at least in the adaptation of the height H of the chassis 112 to match the chassis 112 and the bottom surface 118 of the transportation unit 104 as well as other necessary information so that the controller 110 is configured to control the operation of the loading system 100.

The memory 190 is configured to store at least a communicator program to operate (control) the communicator 192, a power supplier program to operate the power supplier 194, and a user interface program to operate the user interface 196. The memory 190 is further configured to store a computer program 199 that the controller 110 is configured to execute (run, carry out) to control the operation of the loading system 100 as previously has been explained. The computer program 199 comprises computer readable code instructions.

The computer program 199 may be stored in a tangible, non-transitory computer-readable medium, e.g., a Compact Disc (CD) or Universal Serial Bus (USB) storage device.

The invention has been now explained above with reference to the aforesaid exemplary embodiments and the several advantages of the invention have been demonstrated. It is clear that the invention is not only restricted to these embodiments, but it comprises all possible embodiments within the scope of the following claims.

The invention claimed is:

1. A loading system for loading a transport unit, comprising a chassis, a loading carriage mounted on the chassis, and a supporting device mounted on the chassis, which loading system is configured to drive the loading carriage with respect to the chassis in a loading direction (LD) and which loading system is further configured to arrange the supporting device against a load on the loading carriage to support the load when the loading carriage is driven out from under the load, wherein the supporting device comprises an upper supporting part configured to project in the loading direction from other parts of the supporting device, and the loading system is further configured to project the upper loading part by moving the upper supporting part independently in the loading direction relative to the other parts of the supporting device when the supporting device is against the load so as to incline the load in the loading direction to prevent loading damage to the load.

2. The loading system according to claim 1, wherein the supporting device further comprises a projecting mechanism configured to move the upper supporting part independently of the other parts of the supporting device in the loading direction.

3. The loading system according to claim 2, wherein the projecting mechanism comprises a projecting actuator connected to the upper supporting part, which projecting actuator is configured to actuate a substantially vertical movement of the upper supporting part.

4. The loading system according to claim 3, wherein the projecting mechanism comprises a projecting member between the upper supporting part and the projecting actuator, which projecting member is configured to move the upper supporting part in consequence of the actuation of the projecting actuator.

5. The loading system according to claim 3, wherein the projecting mechanism further comprises a hinge between the upper supporting part and the projecting actuator, which hinge is configured incline the upper supporting part with respect to the projecting actuator in the loading direction so that the upper supporting part mounts against a surface of the inclined load.

6. The loading system according to claim 1, wherein the supporting device further comprises a frame and a lower supporting part connected to the frame, which lower supporting part is configured to support the load together with the upper supporting part mounted on the frame.

7. The loading system according to claim 6, wherein the supporting device further comprises a pushing mechanism configured to move lower and upper supporting parts together with respect to the chassis in the loading direction to support the load.

8. The loading system according to claim 7, wherein the pushing mechanism comprises a pushing actuator connected to the frame, which pushing actuator is configured to actuate a substantially horizontal movement (P) of the lower and upper supporting parts, and a pushing member between the frame and the pushing actuator, which pushing member is configured to move the lower and upper supporting parts simultaneous in consequence of the actuation of the pushing actuator.

9. The loading system according to claim 6, wherein the supporting device further comprises wheels mounted on the lower supporting part, which wheels are configured to support the lower supporting part at least against the loading carriage, when the loading carriage moves with respect to the chassis in a retracting direction (RD) opposite the loading direction.

10. The loading system according to claim 1, wherein the supporting device further comprises a frame and a lifting mechanism configured to lift the frame with respect to the chassis in a vertical direction to prevent the loading damage of the load and to allow the load on the loading carriage to move through the supporting device.

11. The loading system according to claim 10, wherein the lifting mechanism comprises a mounting part connected to the chassis and a shaft between the frame and the mounting part on each side of the chassis in the loading direction so that an end of each shaft, which is connected to the frame, is configured to rotate on the mounting part.

12. The loading system according to claim 1, wherein the loading carriage comprises rollers configured to move the loading carriage on the chassis and a ramp mounted at an end of the loading carriage, which ramp is configured to incline the load together with the upper supporting part, when the loading system drives the loading carriage out from under the load in a retracting direction (RD) opposite the loading direction and the upper supporting part projects from the other parts of the supporting device in the loading direction synchronously.

13. The loading system according to claim 1, wherein the chassis comprises legs configured to mount the loading system on a mounting platform and each leg comprises an adjusting actuator configured to adjust a height (H) of the chassis with respect to the mounting platform.

14. The loading system according to claim 1, which further comprises a controller configured to control at least one actuator to operate the loading system.

15. A loading method for loading a transport unit, comprising at least following steps of driving, by a controller, a loading carriage mounted on a chassis with respect to the chassis in a loading direction (LD), arranging, by the controller, a supporting device mounted on the chassis against a load on the loading carriage to support the load when the loading carriage is driven out from under the load, and projecting, by the controller, an upper loading part of the supporting device in the loading direction from other parts of the supporting device by moving the upper supporting part independently in the loading direction relative to the other parts of the supporting device when the supporting device is against the load so as to incline the load in the loading direction to prevent loading damage to the load.

16. A tangible, non-transitory computer readable medium comprising the computer program that comprises instructions, which, when the computer program is executed by a controller, cause a loading system to carry out at least the steps of the loading method according to claim 15.

* * * * *